US012734953B2

(12) United States Patent
Paresa et al.

(10) Patent No.: US 12,734,953 B2
(45) Date of Patent: Sep. 15, 2026

(54) COMPRESSION SPRING DUAL-RATCHET WINCH FOR TIE-DOWN SYSTEMS

(71) Applicant: HYUNDAI TRANSLEAD, San Diego, CA (US)

(72) Inventors: Kaitlyn Paresa, San Diego, CA (US); Loc Bui, San Diego, CA (US); Weilun Chang, San Diego, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 105 days.

(21) Appl. No.: 18/650,488

(22) Filed: Apr. 30, 2024

(65) Prior Publication Data

US 2025/0276633 A1 Sep. 4, 2025

Related U.S. Application Data

(60) Provisional application No. 63/560,193, filed on Mar. 1, 2024.

(51) Int. Cl.
*B60P 7/08* (2006.01)

(52) U.S. Cl.
CPC .................................... *B60P 7/083* (2013.01)

(58) Field of Classification Search
CPC ............................... B60P 7/083; B60P 7/0846
See application file for complete search history.

(56) References Cited

U.S. PATENT DOCUMENTS 3,409,263 A 11/1968 George
5,103,536 A * 4/1992 Kamper .................. B60P 7/083 24/68 CD
5,156,506 A 10/1992 Bailey
5,271,606 A * 12/1993 Kamper .................. B60P 7/083 254/217
7,410,334 B2 * 8/2008 McGrew ............... B60P 7/0853 410/100
7,510,168 B1 * 3/2009 Lin ....................... B65B 13/025 254/218
9,961,967 B2 * 5/2018 Costenbader ......... B60P 7/0823
2006/0042052 A1 3/2006 Lu
2014/0255120 A1 * 9/2014 Simmons .............. B60P 7/0823 410/100
2017/0362066 A1 12/2017 Grapes et al.
2022/0126745 A1 * 4/2022 Graves .................... B60P 7/083
2025/0276633 A1 9/2025 Paresa et al.
2025/0289358 A1 9/2025 Bui et al.

FOREIGN PATENT DOCUMENTS

JP H0158809 B2 12/1989

* cited by examiner

*Primary Examiner* — Daniel D Yabut
(74) *Attorney, Agent, or Firm* — Knobbe, Martens, Olson & Bear, LLP

(57) ABSTRACT

A dual-ratchet winch attached to a plate, the dual-ratchet winch including: a ratchet mechanism coupled to and configured to rotate with respect to the plate, the ratchet mechanism including a pair of gears; a pawl including a pair of pawl tips and a locking hole, the pair of pawl tips configured to engage or disengage the pair of gears of the ratchet mechanism; a pair of wings to accept a pair of compression springs; and a pin assembly configured to keep the pair of pawl tips disengaged from the ratchet mechanism.

19 Claims, 5 Drawing Sheets

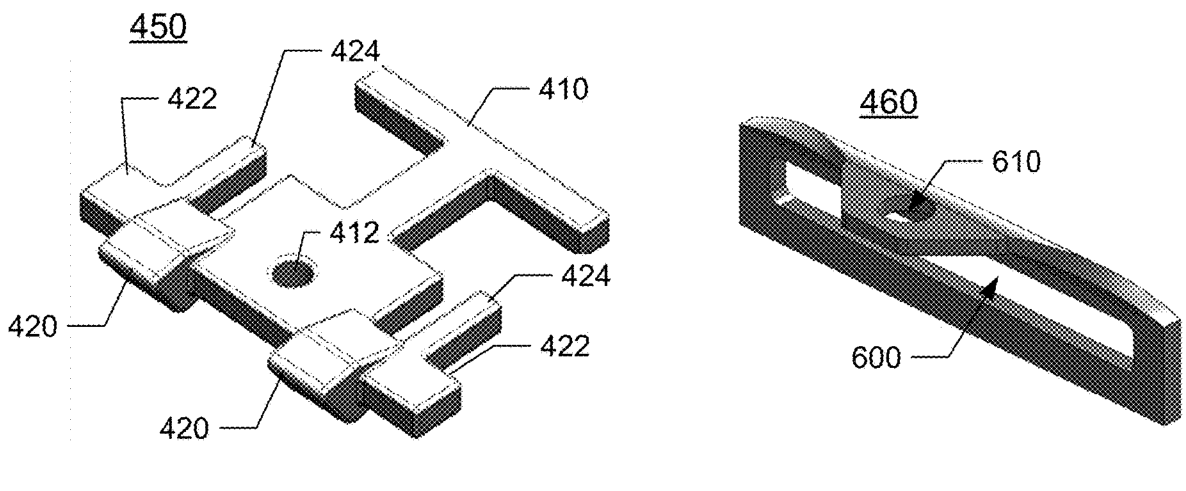
FIG. 5 FIG. 6
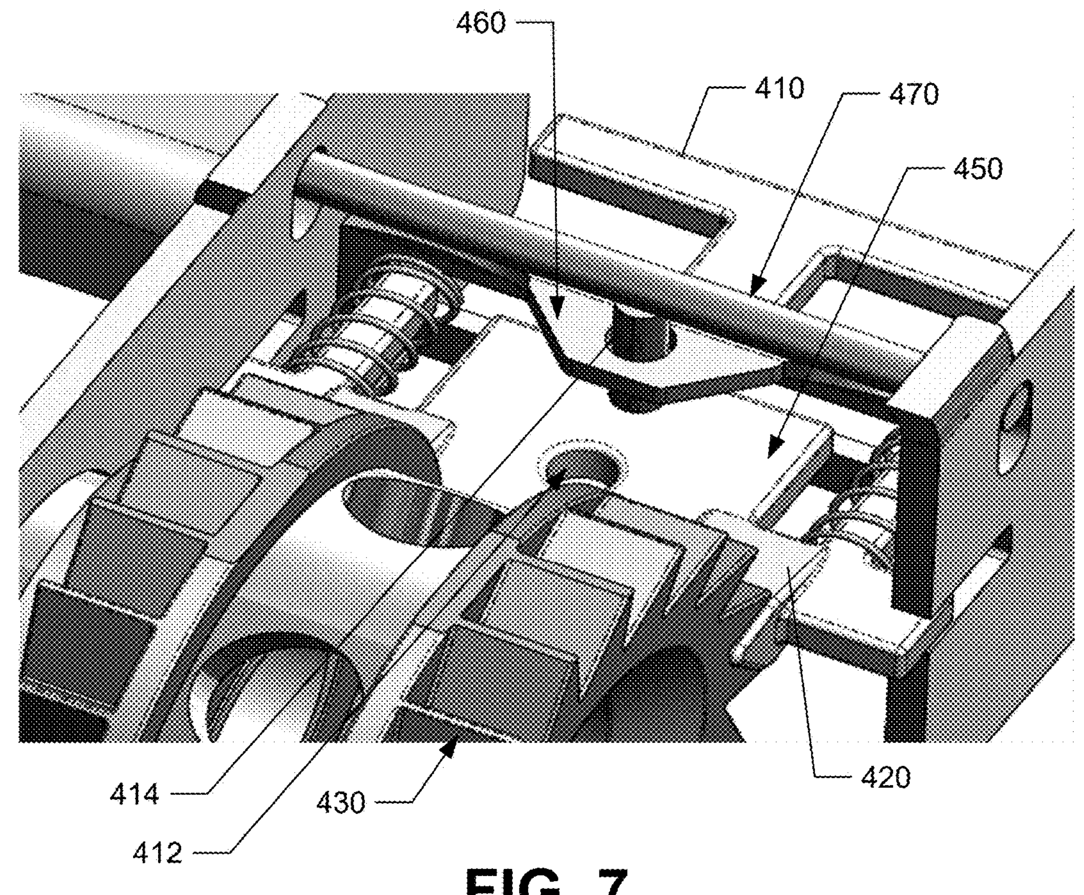
FIG. 7

COMPRESSION SPRING DUAL-RATCHET WINCH FOR TIE-DOWN SYSTEMS

CROSS-REFERENCE TO RELATED APPLICATIONS

This application claims the benefit of priority under 35 U.S.C. § 119 (e) of U.S. Provisional Patent Application No. 63/560,193, filed Mar. 1, 2024, entitled "Compression Spring Dual-Ratchet Winch for Tie-Down Systems." The disclosure of the above-referenced application is incorporated herein by reference.

BACKGROUND

Field of the Invention

The present disclosure relates generally to tie down systems and, more specifically, to compression spring dual-ratchet winch for the tie down systems.

Background

A car hauler trailer may have winches attached to the side to strap the vehicle(s) down to the trailer. A winch may include a ratchet mechanism to enable straps to be tightened and locked to keep the vehicle in place while the trailer is in transit.

FIG. 1 shows a simplified diagram of a ratchet mechanism 100 including a gear 110, a pawl 120, and a spring 130. In FIG. 1, the pawl 120 acts as a stopper for the gear 110 to prevent the movement of the gear 110 in a clockwise direction. In some industries and products, the pawl 120 may apply a force to the gear 110 due to the gravity. However, the ratchet mechanism 100 used for the car hauler trailer cannot rely solely on the force of gravity because the winch is not always in an orientation where gravity acts on the pawl 120 in the correct direction. Thus, the pawl 120 must be spring-loaded. The conventional ratchet mechanisms used in the car hauler trailers have used springs to keep the pawl engaged with the gear. However, the springs used in a configuration to keep the pawl engaged often fail and need to be replaced.

SUMMARY

The present disclosure describes a dual-ratchet winch for a car hauler trailer.

In one implementation, a dual-ratchet winch attached to a plate is disclosed. The dual-ratchet includes: a ratchet mechanism coupled to and configured to rotate with respect to the plate, the ratchet mechanism including a pair of gears; a pawl including a pair of pawl tips and a locking hole, the pair of pawl tips configured to engage or disengage the pair of gears of the ratchet mechanism; and a pin assembly configured to keep the pair of pawl tips disengaged from the ratchet mechanism.

In another implementation, a dual-ratchet winch for a car hauler trailer is disclosed. The dual-ratchet winch includes: a plate attached to a side of the car hauler trailer; a gear mechanism including a plurality of gears, the gear mechanism coupled to and configured to rotate with respect to the plate; and a pawl including a plurality of pawl tips configured to engage or disengage the plurality of gears by moving laterally forward or backward.

In a further implementation, a winch for a car hauler trailer is disclosed. The winch includes: a gear mechanism including at least one gear, the gear mechanism coupled to and configured to rotate with respect to a side of the car hauler trailer; a pawl including at least one pawl tip and a handle, wherein the at least one pawl tip is configured to disengage from the gear mechanism by moving the handle laterally away from the at least one gear; and a compression spring, wherein the at least one pawl tip is configured to engage the gear mechanism by the compression spring pushing the pawl laterally toward the at least one gear.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which:

FIG. 5 is a detailed isometric view of the pawl in accordance with one implementation of the present disclosure;

FIG. 6 is a detailed isometric view of the pawl mounting plate in accordance with one implementation of the present disclosure; and FIG. 7 is a detailed isometric view of the pin assembly mounted above the pawl mounting plate in accordance with one implementation of the present disclosure.

DETAILED DESCRIPTION

As stated above, conventional ratchet mechanisms used in the car hauler trailers have used springs to keep the pawl engaged with the gear. However, the springs used in the conventional ratchet mechanisms often fail and need to be replaced. To improve the design of the existing ratchet mechanism, certain implementations of the present disclosure provide for using pawl, mounting plate, and locking pin along with appropriately-placed springs to engage or disengage the winch gear assembly.

Accordingly, after reading this description it will become apparent how to implement the present disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figures 2A, 2B:
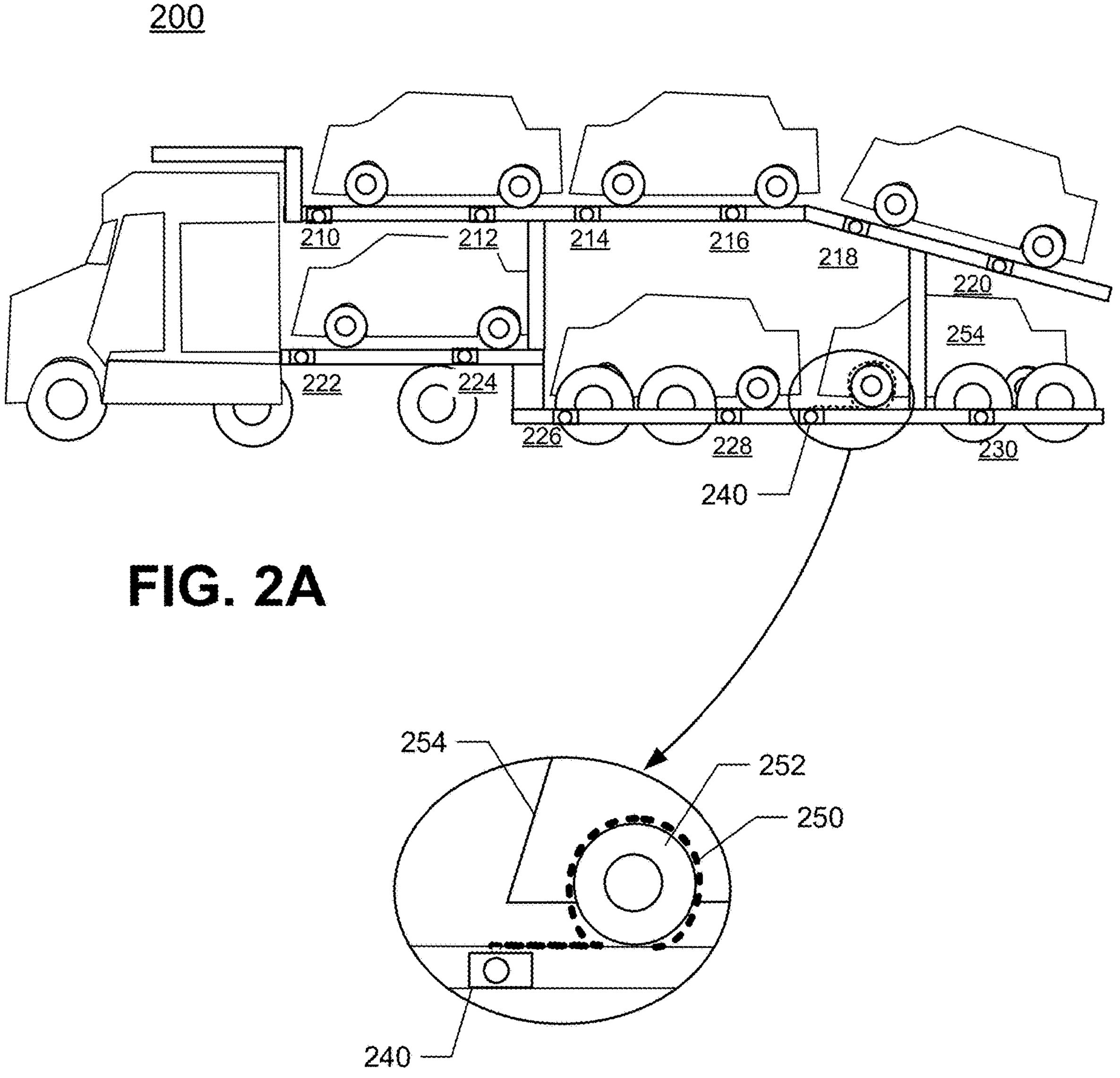
FIG. 2A is a diagram showing a car hauler trailer including winches attached to the side of the trailer in accordance with one implementation of the present disclosure.
FIG. 2B is a detailed view of a winch shown in an inset diagram in accordance with one implementation of the present disclosure.

FIG. 2A is a diagram showing a car hauler trailer 200 including winches 210-230, 240 attached to the side of the trailer 200. In one implementation, a winch (e.g., winch 240) is coupled to a plate which is attached or is part of the side of the trailer 200.

FIG. 2B is a detailed view of a winch 240 shown in an inset diagram. The winch 240 is used to tighten and lock the strap 250 around the tire 252 of the vehicle 254 to keep the vehicle in place (i.e., in a tie-down system) while the trailer is in transit.

Figure 3A:
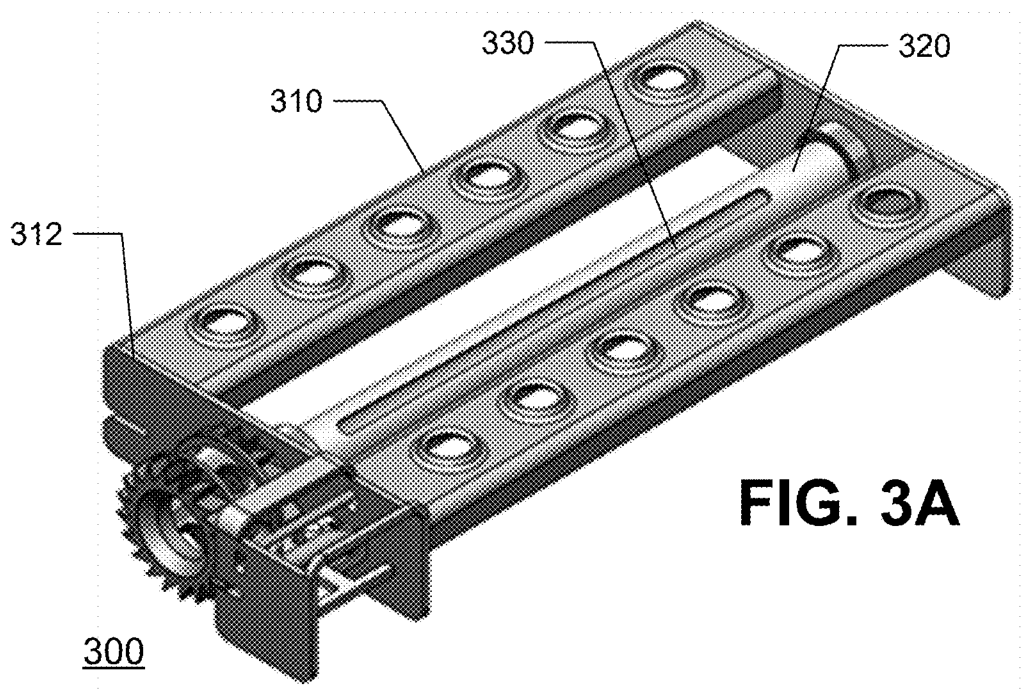
FIG. 3A is an isometric view of a dual-ratchet winch coupled to a plate which is attached to a platform in accordance with one implementation of the present disclosure.

FIG. 3A is an isometric view of a dual-ratchet winch 300 coupled to a plate 312 which is attached to a platform 310 in accordance with one implementation of the present disclosure. In the illustrated implementation of FIG. 3, the dual-ratchet winch 300 also couples to a winch mandrel 320 including a slot 330 to slide a strap through it.

Figure 3B:
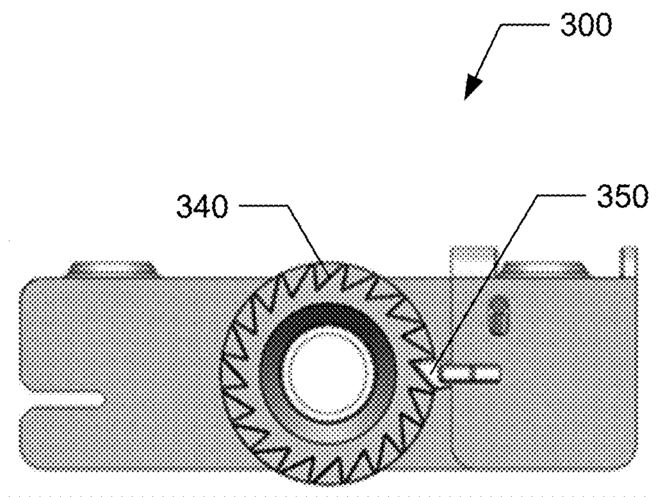
FIG. 3B is a side view of a dual-ratchet winch in accordance with one implementation of the present disclosure.

FIG. 3B is a side view of a dual-ratchet winch 300 in accordance with one implementation of the present disclosure. In FIG. 3, the dual-ratchet winch 300 includes a ratchet mechanism 340 and a pawl 350 to engage or disengage the ratchet mechanism 340. In one implementation, the ratchet mechanism 340 is configured with two ratchets or gears (i.e., dual-ratchet or dual-gear). As will be shown in the subsequent figures, the pawl 350 is configured with two pawl tips and two pawl guides.

Figure 4A:
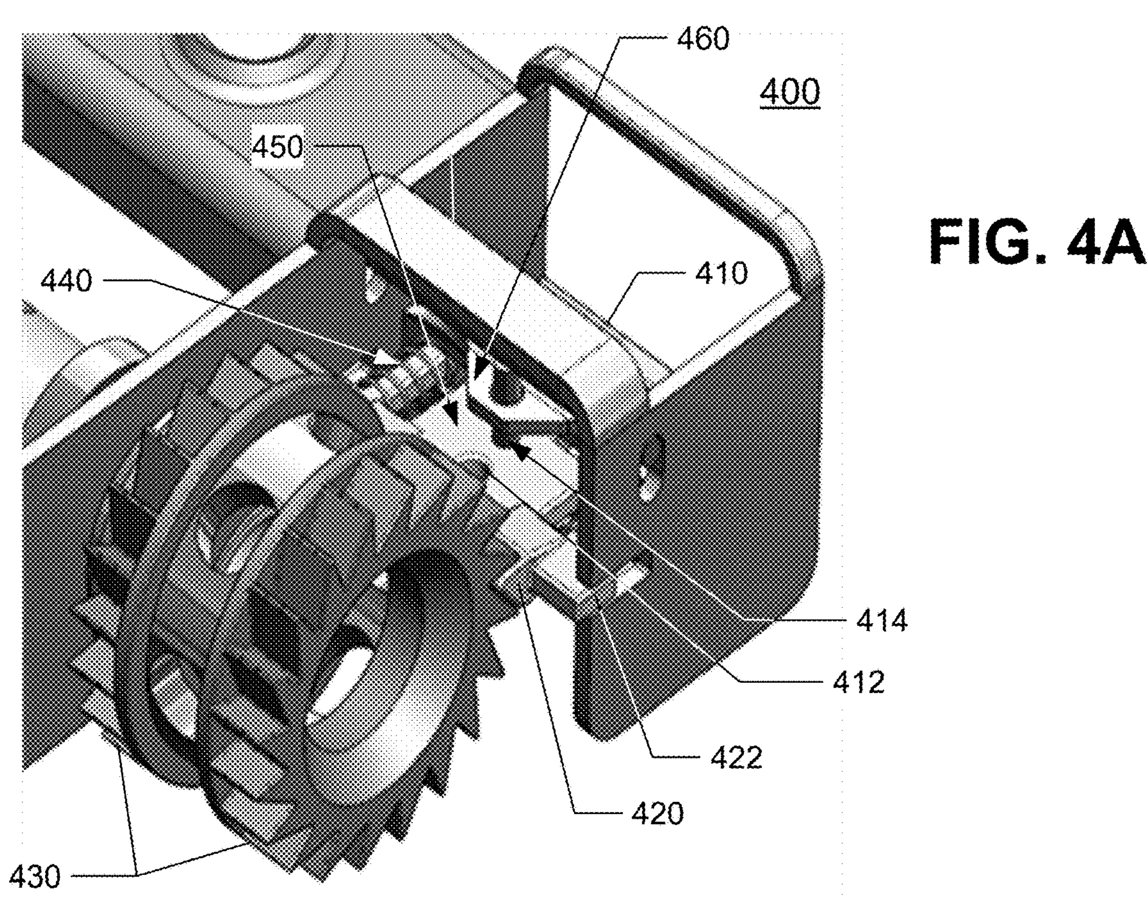
FIG. 4A is a detailed isometric view of a dual-ratchet winch in accordance with one implementation of the present disclosure.

FIG. 4A is a detailed isometric view of a dual-ratchet winch 400 in accordance with one implementation of the present disclosure. In the illustrated implementation of FIG. 4A, parts of the winch 400 is shown in more detail. For example, the winch 400 includes a dual-ratchet mechanism 430 having two gears and a pawl 450 having a pair of pawl tips 420 and a pair of pawl guides 422 attached to it 450. The pawl 450 also includes a T-grip handle 410 and a locking hole 412 (see FIG. 5 for details). Each pawl tip of the pair of pawl tips 420 engages and disengages with each gear of the dual-ratchet mechanism 430. In FIG. 4A, the winch 400 also includes a pawl mounting plate 460 (see FIG. 6 for details), a pair of compression springs 440, and a locking pin 414 attached to a pin assembly (not shown here; see FIG. 7 for details).

Figure 4B:
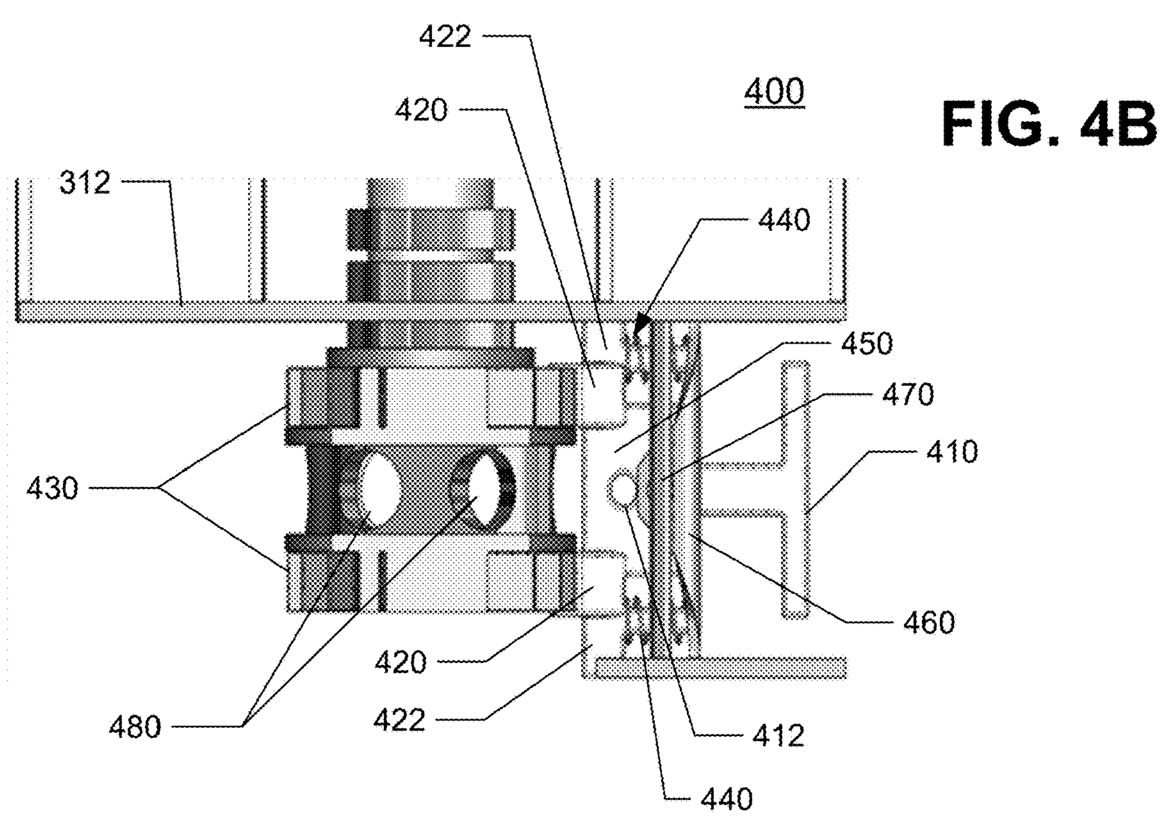
FIG. 4B is a top sectional view with the cutting plane positioned to view the dual-ratchet winch in further detail.

FIG. 4B is a top sectional view with the cutting plane positioned to view the dual-ratchet winch 400 in further detail. In the illustrated implementation of FIG. 4B, the winch 400 includes the dual-ratchet mechanism 430 having two gears. The pawl 450 includes a pair of pawl tips 420 and a pair of pawl guides 422 attached to it 450. The pawl 450 also includes a T-grip handle 410 and a locking hole 412 (see FIG. 5 for details). As illustrated in FIG. 4B, each pawl tip of the pair of pawl tips 420 engages and disengages with each gear of the dual-ratchet mechanism 430. In FIG. 4B, the winch 400 also includes a pawl mounting plate 460 (see FIG. 6 for details), a pair of compression springs 440, and a locking pin 414 attached to a pin assembly 470 (see FIG. 7 for details).

Figure 1:
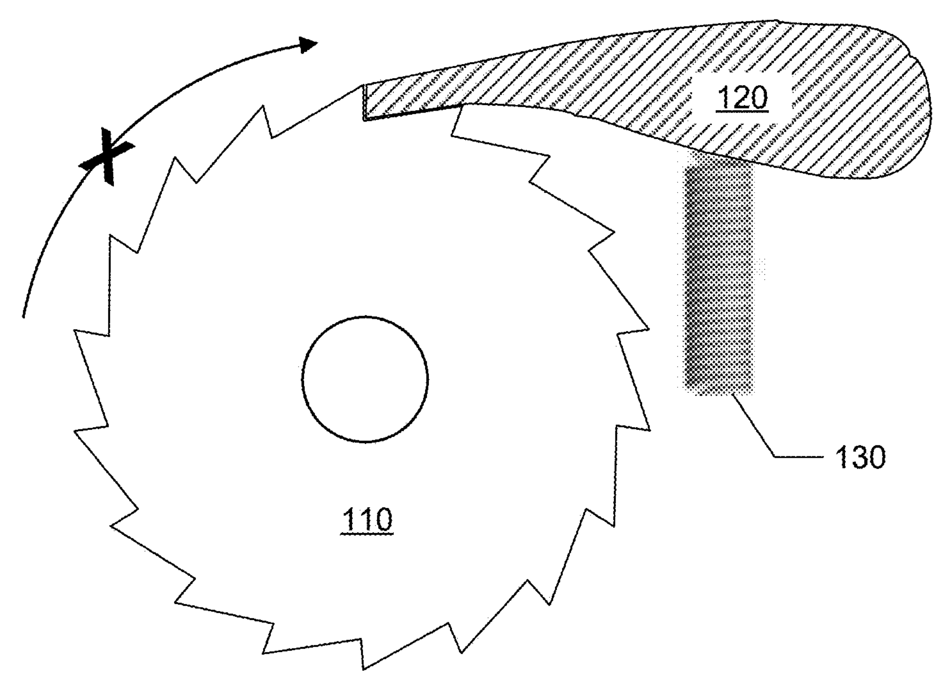
FIG. 1 shows a simplified diagram of a ratchet mechanism including a gear, a pawl, and a spring.

In FIG. 4B, the T-grip handle 410 enables an operator to pull out the pawl 450 to disengage the pair of pawl tips 420 from the two gears of the dual-ratchet mechanism 430. Also, when the operator pulls the T-grip handle 410 out to a disengaged position to disengage the pawl tips 420 from the dual-ratchet mechanism 430, the locking pin 414 (shown in FIG. 4A) drops into the locking hole 412 to keep the pawl tips 420 disengaged from the dual-ratchet mechanism 430. Thus, by securely and completely disengaging the pawl tips 420 from the ratchet mechanism 430, the ratchets or gears can be rotated freely (e.g., by inserting a tie-down bar in the center holes 480) to rotate the ratchet mechanism 430 with respect to the plate 312 to align or loosen the straps (e.g., strap 150 in FIG. 1B). To re-engage the pawl tips 420 on the dual-ratchet mechanism 430, the operator can pull up on the pin assembly 470 (see FIG. 7 for details) to lift the locking pin 414 out of the locking hole 412 and allow the pair of pawl tips 420 to move forward and engage the ratchets or gears of the dual-ratchet mechanism 430. In one implementation, the compression springs 440 are configured to push the pawl 450 forward to allow the pair of pawl tips 420 to engage the ratchets or gears of the dual-ratchet mechanism 430.

As shown in FIGS. 4A and 4B, a dual-gear and dual-pawl configuration of the winch 400 provides a second contact point for added rigidity and promotes a geometry that is wide enough for the T-grip handle 410 to be integrated into the pawl design. Since the T-grip handle 410 is ergonomic, it enables the user to pull the pawl back with one hand and operate the ratchet gear using a tie-down bar with the other hand. Further, the force exerted by the T-grip handle 410 on the dual-ratchet winch 400 is borne by the compression spring 440 (designed to be inexpensive and widely available) in the engaged configuration, which may incur less failures.

FIG. 5 is a detailed isometric view of the pawl 450 in accordance with one implementation of the present disclosure. In the illustrated implementation of FIG. 5, the pawl 450 includes the T-grip handle 410, the pair of pawl tips 420, the pair of pawl guides 422, and the locking hole 412. As described above, when the operator pulls the T-grip handle 410 out to a disengaged position to disengage the pawl tips 420 from the dual-ratchet mechanism 430, the locking pin 414 drops into the locking hole 412 to keep the pawl tips 420 disengaged from the dual-ratchet mechanism 430. In one implementation, the pawl 450 also includes a pair of wings 424 with each wing configured to accept a compression spring 440.

FIG. 6 is a detailed isometric view of the pawl mounting plate 460 in accordance with one implementation of the present disclosure. In the illustrated implementation of FIG. 6, the pawl mounting plate 460 includes a slot 600 through which the pawl 450 is mounted and an opening 610 through which the locking pin 414 passes.

FIG. 7 is a detailed isometric view of the pin assembly 470 mounted above the pawl mounting plate 460 in accordance with one implementation of the present disclosure. In the illustrated implementation of FIG. 7, when the operator pulls the T-grip handle 410 out to a disengaged position to disengage the pawl tips 420 from the dual-ratchet mechanism 430, the locking pin 414 drops into the locking hole 412 to keep the pawl tips 420 disengaged. To re-engage the pawl tips 420 on the dual-ratchet mechanism 430, the operator can pull up on the pin assembly 470 to lift the locking pin 414 out of the locking hole 412 and allow the pawl 450 (along with the pawl tips 420) to move forward and engage the ratchets or gears of the dual-ratchet mechanism 430.

In one implementation, the benefits of the dual-ratchet winch 240, 200, 300, 400 described above:

1) enable distribution of the force and substantial lowering of the risk of a ratchet failure by using the dual-gear and dual-pawl configuration to generate two points of contact;
2) enable easy movement of the ratchets by using the T-grip handle to disengage and lock the pawls before rotating the ratchets to operate the strap;

3) enable easy disengagement of the pawls from the ratchets by using the locking pin automatically falling into the locking hole; and
4) lower maintenance cost by using inexpensive and widely available compression springs for keeping the pawls engaged.

In one particular implementation, a dual-ratchet winch attached to a plate is disclosed. The dual-ratchet winch includes: a ratchet mechanism coupled to and configured to rotate with respect to the plate, the ratchet mechanism including a pair of gears; a pawl including a pair of pawl tips and a locking hole, the pair of pawl tips configured to engage or disengage the pair of gears of the ratchet mechanism; and a pin assembly configured to keep the pair of pawl tips disengaged from the ratchet mechanism.

In one implementation, the pawl further includes a pair of pawl guides configured to guide a movement of the pawl to engage or disengage the ratchet mechanism. In one implementation, the pawl further includes a handle to pull the pawl out and to disengage the pair of pawl tips from the ratchet mechanism. In one implementation, the dual-ratchet winch further includes a pawl mounting plate including a slot through which the pawl is mounted. In one implementation, the pawl mounting plate further includes an opening through which the locking pin passes. In one implementation, the pawl further includes a pair of wings. In one implementation, the dual-ratchet winch further includes a pair of compression springs, each compression spring configured to insert into each wing of the pair of wings. In one implementation, the pin assembly includes a locking pin configured to drop into the locking hole to keep the pair of pawl tips disengaged from the ratchet mechanism. In one implementation, the dual-ratchet winch further includes a plurality of center holes into which a tie-down bar is inserted to rotate the ratchet mechanism with respect to the plate while the pair of pawl tips is disengaged from the ratchet mechanism.

In another particular implementation, a dual-ratchet winch for a car hauler trailer is disclosed. The dual-ratchet winch includes: a plate attached to a side of the car hauler trailer; a gear mechanism including a plurality of gears, the gear mechanism coupled to and configured to rotate with respect to the plate; and a pawl including a plurality of pawl tips configured to engage or disengage the plurality of gears by moving laterally forward or backward.

In one implementation, the pawl further includes a locking hole. In one implementation, the dual-ratchet winch further includes a pin assembly including a locking pin configured to drop into the locking hole to keep the plurality of pawl tips disengaged from the gear mechanism. In one implementation, the pawl further includes a plurality of pawl guides configured to guide a movement of the pawl to engage or disengage the gear mechanism. In one implementation, the dual-ratchet winch further includes a handle for the pawl, wherein the handle enables the pawl to be pulled out and disengage the plurality of pawl tips from the gear mechanism. In one implementation, the dual-ratchet winch further includes a pawl mounting plate including a slot through which the pawl is mounted. In one implementation, the pawl mounting plate further includes an opening through which the locking pin passes. In one implementation, the dual-ratchet winch further includes a plurality of compression springs coupled to the pawl.

In another particular implementation, a winch for a car hauler trailer is disclosed. The winch includes: a gear mechanism including at least one gear, the gear mechanism coupled to and configured to rotate with respect to a side of the car hauler trailer; a pawl including at least one pawl tip and a handle, wherein the at least one pawl tip is configured to disengage from the gear mechanism by moving the handle laterally away from the at least one gear; and a compression spring, wherein the at least one pawl tip is configured to engage the gear mechanism by the compression spring pushing the pawl laterally toward the at least one gear.

In one implementation, the pawl further includes a locking hole. In one implementation, the winch further includes a pin assembly including a locking pin configured to drop into the locking hole to keep the plurality of pawl tips disengaged from the gear mechanism.

The disclosed implementations are provided to enable any person skilled in the art to make or use the disclosure. Various modifications to these implementations will be readily apparent to those skilled in the art, and the generic principles described herein can be applied to other implementations without departing from the spirit or scope of the disclosure. For example, although the ratchet mechanism and the pawl are described as being configured with two gears and tips, the ratchet mechanism and the pawl may be configured with any number of gears and tips. Thus, it is to be understood that the description presented herein shows implementations representative of the subject matter which is broadly contemplated by the present disclosure. All features of each implementation are not necessarily required in a particular implementation. Additional variations and implementations are also possible. Accordingly, the present disclosure is not limited only to the specific implementations describe above.

The invention claimed is:

1. A dual-ratchet winch attached to a plate, the dual-ratchet winch comprising:
a ratchet mechanism coupled to and configured to rotate with respect to the plate,
the ratchet mechanism including a pair of gears and a plurality of holes between the pair of gears, the plurality of holes configured to receive a tie-down bar to rotate the ratchet mechanism with respect to the plate;
a pawl including a pair of pawl tips and a locking hole, the pair of pawl tips configured to engage or disengage the pair of gears of the ratchet mechanism; and
a pin assembly configured to keep the pair of pawl tips disengaged from the ratchet mechanism.

2. The dual-ratchet winch of claim 1, wherein the pawl further includes a pair of pawl guides configured to guide a movement of the pawl to engage or disengage the ratchet mechanism.

3. The dual-ratchet winch of claim 1, wherein the pawl further includes a handle to pull the pawl out and to disengage the pair of pawl tips from the ratchet mechanism.

4. The dual-ratchet winch of claim 1, further comprising a pawl mounting plate including a slot through which the pawl is mounted.

5. The dual-ratchet winch of claim 4, wherein the pawl mounting plate further includes an opening through which a locking pin passes.

6. The dual-ratchet winch of claim 1, wherein the pawl further includes a pair of wings.

7. The dual-ratchet winch of claim 6, further comprising a pair of compression springs, each compression spring configured to insert into each wing of the pair of wings.

8. The dual-ratchet winch of claim 1, wherein the pin assembly includes a locking pin configured to drop into the locking hole to keep the pair of pawl tips disengaged from the ratchet mechanism.

9. A dual-ratchet winch for a car hauler trailer, the dual-ratchet winch comprising:
- a plate attached to a side of the car hauler trailer;
- a gear mechanism coupled to and configured to rotate with respect to the plate, the gear mechanism including a plurality of gears and a plurality of holes between the plurality of gears, the plurality of holes configured to replaceably receive a tie-down bar to rotate the gear mechanism with respect to the plate;

and
- a pawl including a plurality of pawl tips configured to engage or disengage the plurality of gears by moving laterally forward or backward.

10. The dual-ratchet winch of claim 9, wherein the pawl further includes a locking hole.

11. The dual-ratchet winch of claim 10, further comprising a pin assembly including a locking pin configured to drop into the locking hole to keep the plurality of pawl tips disengaged from the gear mechanism.

12. The dual-ratchet winch of claim 9, wherein the pawl further includes a plurality of pawl guides configured to guide a movement of the pawl to engage or disengage the gear mechanism.

13. The dual-ratchet winch of claim 9, further comprising a handle for the pawl, wherein the handle enables the pawl to be pulled out and disengage the plurality of pawl tips from the gear mechanism.

14. The dual-ratchet winch of claim 9, further comprising a pawl mounting plate including a slot through which the pawl is mounted.

15. The dual-ratchet winch of claim 14, wherein the pawl mounting plate further includes an opening through which a locking pin passes.

16. The dual-ratchet winch of claim 9, further comprising a plurality of compression springs coupled to the pawl.

17. A winch for a car hauler trailer, the winch comprising:
- a gear mechanism coupled to and configured to rotate with respect to a side of the car hauler trailer, the gear mechanism including at least one gear and a plurality of holes, the plurality of holes configured to replaceably receive a tie-down bar to rotate the gear mechanism with respect to the side of the car hauler trailer;
- a pawl including at least one pawl tip and a handle, wherein the at least one pawl tip is configured to disengage from the gear mechanism by moving the handle laterally away from the at least one gear; and
- a compression spring, wherein the at least one pawl tip is configured to engage the gear mechanism by the compression spring pushing the pawl laterally toward the at least one gear.

18. The winch of claim 17, wherein the pawl further includes a locking hole.

19. The winch of claim 18, further comprising a pin assembly including a locking pin configured to drop into the locking hole to keep the plurality of pawl tips disengaged from the gear mechanism.

* * * * *